United States Patent Office 3,021,677
Patented Feb. 20, 1962

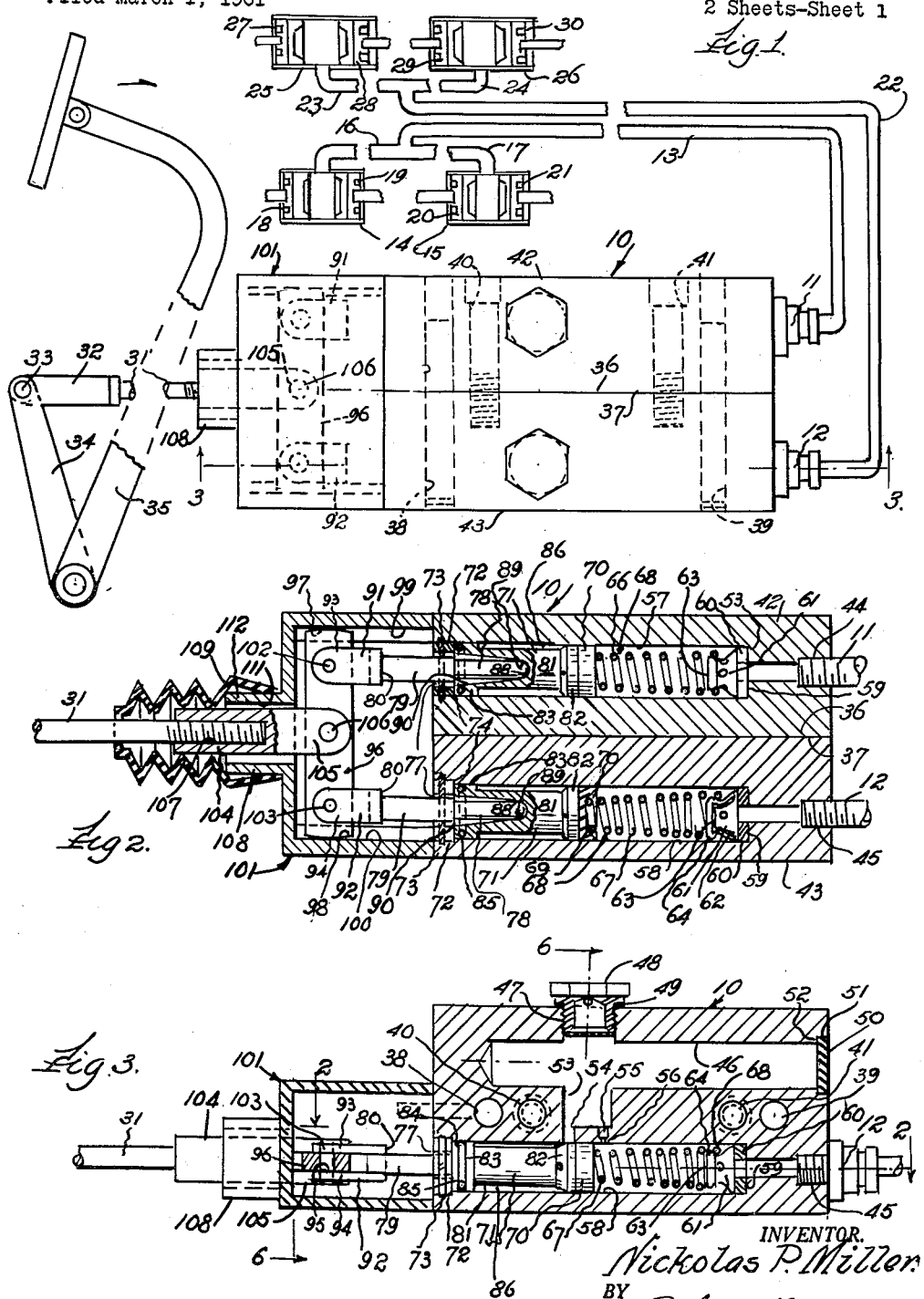

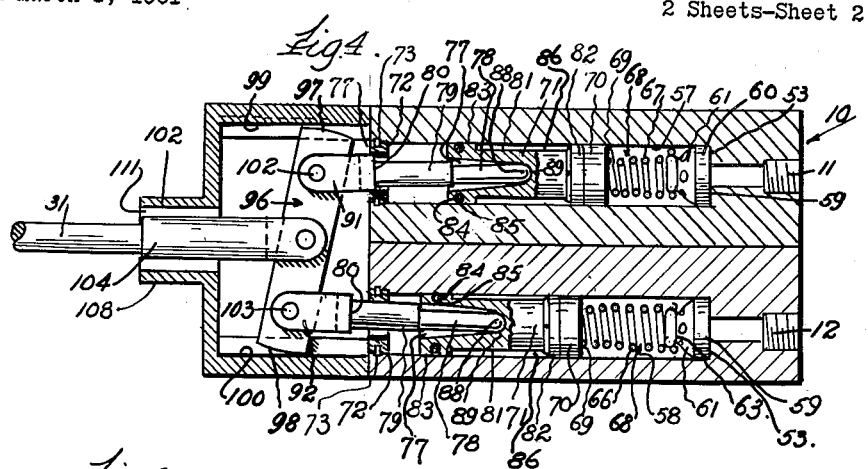
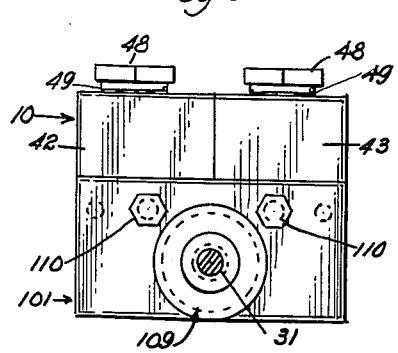
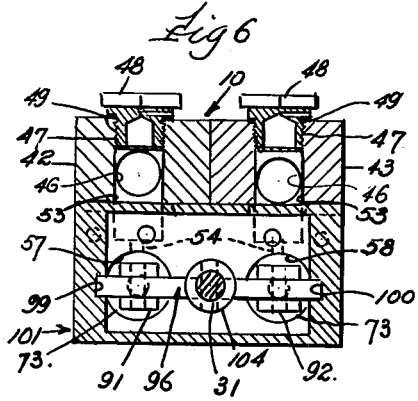
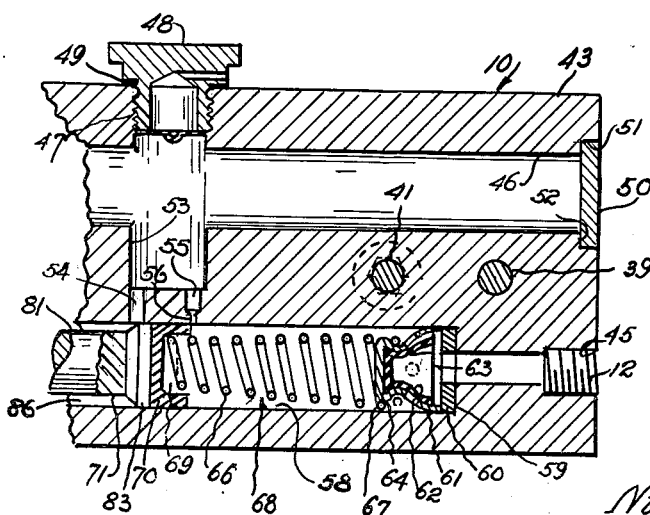

3,021,677
DUAL HYDRAULIC MASTER CYLINDER
AND BRAKE SYSTEM
Nickolas P. Miller, 926 N. Front St., McHenry, Ill.
Filed Mar. 1, 1961, Ser. No. 92,591
4 Claims. (Cl. 60—54.6)

The present invention relates to a dual hydraulic master cylinder and brake system, and is particularly concerned with an improved mechanism for hydraulic brakes whereby one master cylinder may be used for the front wheels and another master cylinder for the rear wheels; and these cylinders provide brakes for the front wheels and for the rear wheels while being actuated by pistons engaged by piston rods connected by a yoke having a stop means for the piston rod which permits each cylinder to be moved only half the distance provided by the yoke so that the rest of the pedal brake movement may be utilized on the other cylinder when one has a leak in its hydraulic system, the other cylinder providing brakes for stopping the car in spite of the leak in the one cylinder.

One of the objects of the invention is the provision of an improved brake system and an improved dual master cylinder which is simple in construction, which has a minimum number of parts and which is adapted to be used on many different forms of construction of hydraulic brakes while still accomplishing its safety function by merely making the active length portion of the piston rod of a suitable dimension for the particular car or brake system.

Another object of the invention is the provision of an improved dual hydraulic cylinder for brakes which is certain and positive in its action and which may be used for a long period of time without necessity for repair or replacement of any of its parts.

Another object of the invention is the provision of an improved actuating mechanism for dual hydraulic cylinders of hydraulic brakes in which each piston rod is universally connected to the piston, but the actuating ends of the rods are guided by the housing and by a cross yoke sliding in the housing to control the movement of the outer end of each piston rod.

Other objects and advantages of the invention will be apparent from the following description and the accompanying drawings, in which similar characters of reference indicate similar parts throughout the several views.

Referring to the two sheets of drawings accompanying this specification,

FIG. 1 is a diagrammatic illustration of the elements of the system, utilizing such a dual master cylinder;

FIG. 2 is a sectional view of the dual cylinder unit, taken on the plane of the line 2—2 of FIG. 3;

FIG. 3 is another sectional view of the dual cylinder, taken on the plane of the line 3—3 of FIG. 1;

FIG. 4 is a view similar to FIG. 2, showing the position which the yoke and piston rods take when there may be a leak in one of the elements of the hydraulic system for one pair of wheels;

FIG. 5 is an end elevational view taken from the left end of FIG. 2;

FIG. 6 is a sectional view taken on the plane of the line 6—6 of FIG. 3;

FIG. 7 is a fragmentary sectional view similar to FIG. 3 on a larger scale.

Referring to FIG. 1, 10 indicates in its entirety my dual hydraulic cylinder unit, which is shown in connection with the other elements of a hydraulic brake system.

The dual cylinder unit has two discharge ports 11 and 12; and the discharge port 11 is connected by a hydraulic conduit 13 to a pair of brake cylinders 14, 15 by means of branch conduits 16 and 17. Each brake cylinder 14, 15 contains the usual pistons 18, 19, 20, 21 acting on the brake shoes, in this case the front wheels.

The port 12 from the dual master cylinder is connected by conduit 22 to branch conduits 23, 24, which extend to the brake cylinders 25, 26 for the rear wheels.

These wheels have their brake shoes connected to the pistons 27, 28, 29, 30 in the usual manner.

The master cylinder unit 10 has an actuating rod 31 extending from it and connected by a shackle 32 and pivot 33 to a crank lever 34, which is secured to the brake pedal 35.

Referring to FIG. 2, this is a sectional view of the dual hydraulic cylinder of my invention, which is shown in partial section in FIG. 3.

The dual hydraulic cylinder unit 10 may consist of a pair of rectangular blocks of metal which are secured together at the two adjacent plane sides 36, 37 by dowels in the registering bores 38, 39 and by threaded screw bolts in the bores 40, 41, having heads outside of one block and threaded into bores in other block.

Each of the two blocks 42, 43 is identical in construction, as shown in section in FIG. 2.

Therefore each block is provided with a discharge port 11 and 12, previously mentioned; and the discharge ports lead to threaded counterbores 44, 45 suitable for attachment of hydraulic fittings for the pipes 13 and 22.

Each block is provided with a longitudinally extending reservoir bore 46 having an upper threaded filling opening 47 closed by a threaded plug 48 and a gasket 49. The open end of the reservoir may be closed by a metal disc 50 frictionally engaged in a counterbore 51 against an annular shoulder 52.

Each reservoir may have an extension 53 of the threaded bore 47 in its lower wall leading to a pair of drilled outlet conduits 54 and 55; and the latter conduit, 55, may have a reduced bore 56 at its lower end.

Each block 42, 43 is provided with a cylindrical bore 57 or 58 leading to the discharge ports 11 and 12, at which end there is an annular shoulder 59 against which a washer of natural or synthetic rubber 60 is seated.

This provides a valve seat for a check valve 61 which is of tapered frusto-conical cup shape, comprising an inner rubber cup 62 fitting in an outer pressed sheet metal cup 63 of complementary shape and having a bead 64 around its small end, retaining the rubber, inside the metal cup.

A coil spring preferably has its coils 66, 67 formed to engage outside the bead 65 and also to engage the end of the cup 63.

The other end of the coil spring, indicated in its entirety by 68, has its coils at that end reduced, as indicated at 69, to fit inside a rubber piston cup 70, which is pressed against a piston 71 by the spring.

The spring 68 acts on the piston, urging it outward, and it reacts on the check valve 61, urging it outward.

Each cylinder bore 57 or 58 extends to the open end of the cylinder at the left, where each has a slightly larger counterbore 72 receiving a metal washer 73 against an annular shoulder 74, where the washer is retained by a split steel ring 75 in a groove 76.

Washer 73 has an enlarged bore 77 for passing the reduced end 78 of a piston rod 79. Washer 73 serves as a stop shoulder in retaining the piston 71 in its cylinder bore, and also as a fixed stop for engaging a shoulder 80 on the piston rod 79.

Each piston may comprise a metal member having a reduced cylindrical mid portion 81 and a pair of larger cylindrical guide flanges 82, 83 at its ends sliding in the cylinder bore. The enlarged portion 83 has a groove 84 for receiving an O ring 85, effecting a seal at this end of the piston.

The annular space 86 surrounding the piston 71 is at all times in communication with the bore 54 extending to the reservoir bore 46 so that oil in the space 86 may circulate back into the reservoir when the piston 71 moves.

The rubber cup 70 on the piston is adapted to cut off communication with the reservoir bore 46 at the restricted port 56 when the rubber cup 70 passes this port 56 toward the right.

The interior structure and content of each cylinder bore 57 and 58 is identical; and they are provided with similar piston rods 79 and 87.

Each piston rod has a partially spherical end portion 88 engaging in a complementary bore 89; and the bore 89 tapers inward, becoming larger at 90 toward its open end so that the piston rod may pivot universally in the piston.

Each piston rod is formed with a U shaped shackle 91, 92 at its outer end; and each shackle has two flanges 93, 94 separated by a parallel walled slot 95, which is adapted to receive one of the ends of a yoke 96.

The yoke is a flat bar of metal, such as steel, provided with rounded ends 97, 98 for pivotal as well as sliding movement in slots 99 and 100 formed in the side walls of a guide housing 101. The yoke is pivotally connected to each shackle by a pivot pin 102, 103, which has its ends riveted over outside the flanges 93, 94.

The yoke is pivotally connected to an actuating rod 104 by means of a shackle formation 105 on the end of a rod having two flanges and a riveted pivot pin 106.

The actuating rod 104 may have a threaded bore 107 for receiving a threaded rod connecting it to the foot pedal; and a metal collar 108 may be carried by the housing 101 for supporting a boot 109 engaging about the collar and the rod to exclude dirt.

The housing 101 comprises a rectangular metal box which is aligned with the two blocks 42, 43 by means of dowel pins and secured by means of threaded screw bolts 110 threaded into the blocks.

An enlarged aperture 111 is provided in the end wall 112 for permitting pivotal movement of the rod 104 on the yoke 96.

The operation of the hydraulic dual cylinder is as follows. Ordinarily the brake pedal drives the rod 104 inward when subjected to foot pressure; and the yoke 96 actuates both piston rods 79, 87, producing equal pressure in both cylinders and applying brakes to all of the wheels in the ratio provided by the mechanism.

When there is a leak in one of the hydraulic systems extending to the brake cylinders, there is no resistance to the movement of the master cylinder piston for those brakes except the spring and the piston rod for the leaking part of the system moves inward freely without actuating its brakes.

For example, under such conditions the piston rod 87 may move inward until the shoulder 80 on that piston rod engages the washer 73; but the other hydraulic cylinder and system is still operative because the full movement of one end of the yoke leaves the other end of the yoke still operative on its piston rod, piston, and brakes.

Thus the user will still have brakes on one set of wheels, even though the other set becomes inoperative.

For adapting the present dual cylinder to different cars or different brake systems it is only necessary to change the effective length of the piston rods.

The present dual hydraulic cylinder and brake system is simple and universally applicable to many types of hydraulic brakes.

It will thus be observed that I have invented an improved and simplified dual hydraulic cylinder brake system and hydraulic unit which utilizes a minimum number of parts and may be manufactured more economically than the more complicated devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A dual master cylinder for hydraulic brake systems, comprising a metal housing having a pair of cylindrical master cylinder bores side by side in said housing, each cylinder bore having an outlet bore of reduced diameter at one end and an annular shoulder surrounding each of said outlet bores, a resilient washer in each cylinder bore seated against said annular shoulder, a check valve in each cylinder bore engaging said resilient washer and engaged on its opposite side by a compression spring, a separate piston in each cylinder bore and having a resilient piston cup engaged by each spring, each piston having an elongated reduced central body and a liquid seal about its end opposite to said piston cup, and each piston having a tapered rod socket terminating in a partially spherical socket end, a piston rod in each piston socket, and having a rounded end for pivotal movement of the rod in the tapered socket, a transverse yoke pivotally connected to both piston rods and having an intermediate pivotal connection to an actuating rod actuated by a brake pedal, said transverse yoke having its ends projecting beyond each pivotal connection to the piston rods, said housing having a pair of opposite parallel guide slots, and the projecting ends of the yoke sliding in said guide slots, the slots guiding the yoke ends against lateral tilting and permitting pivotal movement of the yoke relative to the piston rods and to its actuating rod, and a fixed stop for limiting the inward movement of each piston, leakage of the hydraulic system of either cylinder permitting the leaking cylinder to move only half of the range of movement of the yoke, and the other half of the range of movement of the yoke remaining effective to actuate the piston in the other cylinder and the brakes controlled thereby.

2. A dual master cylinder according to claim 1, in which the ends of the transverse yoke are curved for pivotal movement as well as sliding movement in said parallel guide slots.

3. A dual master cylinder according to claim 1, in which each piston rod is pivotally connected to the yoke by a U shaped shackle and pin, said shackle engaging said fixed stop in each case to limit inward movement of the piston rod.

4. A dual master cylinder according to claim 1, in which the fixed stop comprises an annular washer seated against an annular shoulder in each cylinder and held therein by a split ring in a groove in the cylinder wall.

References Cited in the file of this patent

UNITED STATES PATENTS

| | | |
|---|---|---|
| 1,343,008 | Sauvage | June 8, 1920 |
| 1,513,905 | Hiern | Nov. 4, 1924 |
| 2,065,459 | Jenkins | Dec. 22, 1936 |
| 2,131,459 | Weatherhead | Sept. 27, 1938 |
| 2,152,345 | Bowen | Mar. 28, 1939 |
| 2,375,415 | Hollowell et al. | May 8, 1945 |
| 2,688,951 | Sears | Sept. 14, 1954 |
| 2,732,723 | Crofton | Jan. 31, 1956 |
| 2,847,827 | Johnson | Aug. 19, 1958 |
| 2,947,145 | Choate et al. | Aug. 2, 1960 |